United States Patent [19]

Laundon et al.

[11] Patent Number: 4,624,845

[45] Date of Patent: Nov. 25, 1986

[54] PROCESS FOR PREPARING AN IRON OXIDE

[76] Inventors: Roy D. Laundon, 2 Barn Meadow Lane, Great Bookham, Leatherhead, Surrey; Anthony J. Wickens, 8 Oaks Way, Surbiton, Surrey; John H. W. Turner, Cornerstones, Cockyard, Chapel-en-le-Frith Via Stockport, Cheshire, all of England

[21] Appl. No.: 582,332

[22] Filed: Feb. 22, 1984

[30] Foreign Application Priority Data

Feb. 24, 1983 [GB]  United Kingdom ................. 8305145
Feb. 24, 1983 [GB]  United Kingdom ................. 8305146

[51] Int. Cl.$^4$ ........................ C01G 49/06; C01G 49/10
[52] U.S. Cl. ...................................... 423/633; 423/493
[58] Field of Search ........ 423/633, 634, 493, DIG. 12

[56] References Cited

U.S. PATENT DOCUMENTS

| | | | |
|---|---|---|---|
| 3,376,112 | 4/1968 | Dunn, Jr. et al. | 423/DIG. 12 |
| 3,793,444 | 2/1974 | Reeves et al. | 423/633 |
| 3,864,463 | 2/1975 | Chao | 423/633 |
| 4,179,492 | 12/1979 | Krusei | 423/DIG. 12 |

FOREIGN PATENT DOCUMENTS

| | | | |
|---|---|---|---|
| 1535 | 1/1966 | Japan | 423/633 |
| 547005 | 8/1942 | United Kingdom | 423/493 |
| 1232307 | 5/1971 | United Kingdom | 423/493 |

*Primary Examiner*—John Doll
*Assistant Examiner*—Jeffrey Edwin Russel
*Attorney, Agent, or Firm*—Barry G. Magidoff

[57] ABSTRACT

A process is disclosed for the production of micaceous iron oxide using metallic iron, for example scrap iron, as a feed stock for the preparation of an iron chloride and the resulting iron chloride is oxidized at an elevated temperature in the presence of a salt of an alkali metal or alkaline earth metal, preferably sodium chloride. A reaction may be effected in a packed tower reactor comprising a refractory tube 7 containing an inert packing material e.g. aluminosilicate ceramic balls. The reaction charge including packing material, metallic iron and the salt is introduced via hopper 13. A tube 7 is externally heated by electrical resistance elements 10 and chlorine and an oxidizing gas are introduced at inlet 8 and the off-gas removed at outlet 9. The micaceous iron reaction product is obtained as a coating on the inert packing material. Micaceous iron oxide is used as a pigment for the formulation of metal protective paints.

22 Claims, 4 Drawing Figures

PROCESS FOR PREPARING AN IRON OXIDE

This invention relates to a process for the preparation of an iron oxide. More particularly, this invention relates to a process for the production of micaceous iron oxide.

Micaceous iron oxide is known as a naturally occurring ore which is a steel grey lamellar powder, also known as flake haematite. The flaky structure of the iron oxide is its distinguishing feature since chemically it is substantially ferric oxide ($\gamma$-Fe$_2$O$_3$). The individual particles of micaceous iron oxide resemble thin plates and a major proportion has a size range of 5-150 microns.

Micaceous iron oxide is used as a pigment for the formulation of metal protective paints. This use is based primarily on the lamellar nature of the oxide pigment. The plate-like or leafy structure of the micaceous iron oxide provides a physical barrier to the penetration of moisture and thereby reduces the chance of corrosion of the underlying metal substrate. Furthermore, the flakes of this grey pigment reflect solar radiation to a high degree, and a paint film containing this oxide maintains its reflectant ability for many years by shielding the binder from the ultraviolet radiation in sunlight.

Micaceous iron oxide has been mined successfully in Spain, England and Austria. However, the deposits in Spain and England have now been exhausted, and the dominant world source is now in Austria, although the quality of the Austrian material is less satisfactory than were the English or were the Spanish oxides. Micaceous iron oxide has in recent years been subject to a considerable price escalation. Thus the paint industry has been faced with a reduction in quality and an increase in prices, coupled with some uncertainty of supply.

Various methods have been described in the literature for the manufacture of synthetic micaceous iron oxide. For example, U.S. Pat. No. 3,987,156 describes a process for the production of micaceous iron oxide by subjecting an aqueous paste, obtained by mixing an aqueous ferric sulphate solution with an aqueous sodium hydroxide solution, to a hydrothermal treatment whereby micaceous iron oxide is formed in the shape of hexagonal lamellar crystals in conjunction with sodium sulphate. Similar types of processes involving reactions in aqueous media have also been described in Japanese Patent Publications Nos. 75 35096, 74 44878 and 74 90599. However, none of the above-mentioned processes has led to a commercially viable process, since they all require either a complicated series of reaction steps or the use of very specific operating conditions, generally in aqueous media.

Other methods described in the literature relate to processes in which micaceous iron oxide is formed by the oxidation of an iron chloride feedstock. For example, U.S. Pat. No. 3,864,463 described the production of $\alpha$-Fe$_2$O$_3$ in platelet form having a particle diameter of 2-100 microns by reaction of ferric chloride in the vapour phase with an oxygen-containing gas at a temperature of 400°-750° C. wherein the reaction is performed in a static bed of generally spheroidal particles and in the presence of a specified amount of an alkali metal halide. Japanese Patent Application No. 1966-1535 describes the formation of a flaky oxide of iron, by introducing oxygen or an oxygen-containing gas into a liquid melt comprising a mixture of an iron (III) chloride with a metal chloride chosen from the Group:- K, Na, Li, Sr and Ca chlorides. The oxidation reaction is carried out in the temperature range 500°-950° C.

Such methods comprising the oxidation of iron chlorides possess certain advantages in terms of the simplicity and speed of the chemical reactions involved. High conversions and rapid rates of reaction can be obtained at the relatively high temperatures employed.

According to another example, U.S. Pat. No. 3,864,463 describes a process for the oxidation of iron chloride in the vapour phase. A particular problem of vapour-phase oxidation is that there is a severe tendency for iron oxide scale to accumulate on the reactor walls and on associated equipment, thereby causing problems in the efficient operation and maintenance of the reactor. Furthermore the process described in U.S. Pat. No. 3,864,463 comprises a vapour-phase oxidation reaction which is effected in the presence of a bed of inert particles. This gives rise to difficulties in the removal of the product iron oxide from the reactor and in the sticking of the bed material.

The problems associated with vapour-phase oxidation can be largely circumvented by employing the oxidation of a melt, such as described, for example, in Japanese Patent Application No. 1966-1535, in which oxygen-containing gas is passed into a melt consisting of a mixture of ferrous or ferric chloride with a suitable added alkali- or alkaline-earth metal salt. The major function of the added salt, for example potassium chloride, is to suppress the volatility of ferric chloride by the formation of complex species such as KFeCl$_4$. The latter remains in the melt and enables oxidation to be effected without substantial loss of iron chlorides due to the vaporisation of FeCl$_3$. Oxidation of a melt containing iron chlorides as described in Japanese Patent Application No. 1966-1535 incurs other types of operational problems, however, which are caused by the reduction in mobility of such molten systems which occurs when the concentration of suspended iron oxide (formed as the product of the oxidation reaction) becomes relatively high. We have observed that when a suitable melt of iron chloride and one or more salts of the composition proposed is heated to a temperature in the range 600°-750° C. and oxidised by the passage of oxygen through the melt, the oxide product formed as a suspension in the melt acts to increase the consistency of the melt. This increase is such that when about half the iron chloride content of the melt has been converted to iron oxide and chlorine the partially-oxidised melt has the consistency of a thick mud which may block the oxygen inlet tube and prevent further progress of the oxidation reaction in this form. Furthermore, the relatively rapid rise in liquidus temperature of the iron chloride-added salt system as the iron chloride is consumed by oxidation effectively imposes an upper limit of 40-50 percent by weight of the conversion of iron chloride to iron oxide.

It is therefore apparent that notwithstanding the apparent simplicity of the underlying chemistry involved in the oxidation of iron chlorides in the vapour-phase or in a molten phase to produce micaceous iron oxide, there are serious operational problems associated with each of these methods of carrying out the reaction.

Thus, the present invention is based on the finding that micaceous iron oxide can be obtained by subjecting an iron chloride to oxidation with oxygen or an oxygen-containing gas at an elevated temperature in the presence of at least one salt of an alkali metal or alkaline earth metal.

According to a particular aspect of the process according to the invention the iron chloride starting material is prepared from a metallic iron feedstock.

According to one embodiment of the process according to the invention the reaction is effected in a packed-tower reactor in the presence of an inert packing material.

According to this embodiment, reaction conditions are controlled such that the product formed in a melt film on the inert packing material, the said film having a minimum film thickness of 150μ.

The oxidation of the iron chloride occurs according to the chemical equations:

$$3FeCl_2 + 3NaCl + \tfrac{3}{2}O_2 \rightarrow \tfrac{3}{2}Fe_2O_3 + 3NaCl + 2FeCl_3 \qquad (1)$$

$$2FeCl_3 + 3NaCl + 3/2 O_2 \rightarrow Fe_2O_3 + 3NaCl + 3Cl_2 \qquad (2)$$

These equations illustrate the use of sodium chloride as the added alkali- or alkaline-earth metal salt. Equation (2) refers to the oxidation of ferric chloride; Equations (1) and (2) together represent the oxidation of ferrous chloride, which first undergoes oxidation to give ferric chloride and micaceous iron oxide, followed by oxidation of the ferric chloride to give micaceous iron oxide and elemental chlorine.

According to this embodiment, the iron chloride starting material may be, for example an iron chloride obtained as a by-product from the carbo-chlorination or sulpho-chlorination of minerals such as titaniferous and aluminous minerals e.g. ilmenite and bauxite, of which iron is a secondary component or from spent acid produced as a by-product of the pickling of ferrous metals with hydrochloric acid.

When a titaniferous material such as ilmenite is chlorinated in order to extract its $TiO_2$ content as $TiCl_4$ by known chlorination processes and, in particular, by the so-called "carbochlorination" which is chlorination in the presence of carbon or a carbon-containing reducing agent, e.g. chlorination in the presence of carbon and/or carbon monoxide at temperatures between 800° and 1200° C., significant quantities of iron chloride are usually obtained as a by-product. This iron chloride may be ferrous or ferric, or a combination of both, depending on reaction conditions in the chlorinator.

Similarly, when an aluminous material such as bauxite is chlorinated in order to extract its aluminium content as a volatile chloride by known carbochlorination or sulpho-chlorination processes, significant quantities of iron chloride are usually obtained as by-product. This iron chloride may be either ferrous or ferric chloride, or a combination of both, depending on reaction conditions in the chlorinator and on the method chosen to separate the by-product iron chloride from the primary product, aluminium chloride but it is more usually in the form of ferric chloride.

Other suitable sources of iron chloride are, for example, iron chlorides by-produced in the chlorination of copper sulphide or nickel sulphide ores.

Iron chloride by-products from all these mineral chlorination processes contain valuable chlorine in chemically combined form. According to another aspect of this embodiment of the invention, it is desirable, therefore, to recover these chlorine values, in particular for recycling to the chlorinator. This is particularly true when the chlorination of a titaniferous material such as ilmenite forms the first stage of the so-called chloride route to the $TiO_2$ pigment since the quantity of iron chloride by-produced is then considerable. In the case of the chlorination of an aluminous material such as bauxite the by-production of iron chloride, though generally less than with ilmenite, is still large and represents a serious loss of chlorine values. In both cases the environmental problems posed by the by-production of large quantities of iron chlorides, with consequent need for disposal of these materials, are no less serious.

A further need is an industrially feasible process for the recovery of chlorine values from substantially anhydrous iron chloride derived from aqueous solution, in particular, from substantially anhydrous ferrous chloride derived from spent pickle acid which accumulates in the final stages of steel manufacture.

The predominant use of such spent pickle acid is the manufacture of red iron oxide pigment, West Germany being the major centre of production.

One disadvantage of this use of spent pickle acid is that high processing and capital costs make it economic only on a very large scale so that much spent pickle acid is wasted. Another disadvantage is that ferrous chloride is generally reacted with lime to precipitate ferrous hydroxide, leaving calcium chloride in solution for waste disposal, and, thus, the chlorine values in the ferrous chloride are lost.

Another, although less widely used, method of utilising spent pickle acid is to spray-roast the spent pickle liquour to produce a weak hydrochloric acid (about 18% compared with the usual 36% level of concentrated hydrochloric acid). However, this method is energy-intensive and results in a ferric oxide by-product of little pigmentary value.

There is therefore a need in the industry for a new method for the treatment of spent pickle acid in which the chlorine values from the contained ferrous chloride are recovered and in which an iron oxide of significant industrial utility, micaceous iron oxide, is produced.

According to another preferred possibility, the iron chloride starting material may be obtained by direct reaction between iron metal and elemental chlorine.

According to a preferred aspect of the invention metallic iron is used as feedstock to form an iron chloride.

Thus the metallic iron feedstock is oxidised, not directly, but by first forming iron chlorides and then oxidising these. This step is essential to the selective formation of micaceous iron oxide rather than other types of oxide (e.g. red iron oxide, magnetite etc) which form when iron is oxidised directly in air or oxygen under various conditions.

A number of processes for carrying out this reaction are known. The iron metal and elemental chlorine may be fed into the reactor used in the process according to the present invention to generate the iron chloride in situ, according to the chemical equation:

$$2Fe + 3Cl_2 \rightarrow 2FeCl_3 \qquad (3)$$

Since this reaction occurs in the presence of added alkali- or alkaline-earth metal salt, the reaction is more realistically represented, using sodium chloride as the added salt, by the chemical equation:

$$2Fe + 3Cl_2 + 3NaCl \rightarrow 2FeCl_3 + 3NaCl \qquad (4)$$

Iron metal may also be used to reduce a ferric chloride feed material, in the presence of a suitable added salt, to form ferrous chloride which is subsequently oxidised to micaceous iron oxide according to the invention.

The reduction reaction is represented by the chemical equation:

$$2FeCl_3 + 3NaCl + Fe \rightarrow 3FeCl_2 + 3NaCl \quad (5)$$

Equation (5) again illustrates the use of sodium chloride as the added salt.

Another method of carrying out the reaction process of this invention is by external recycle of chlorine. Thus a melt consisting of $NaFeCl_4$ (or $NaFeCl_3$) is oxidised to micaceous iron oxide and chlorine according to equation (6):

$$2NaFeCl_4 + 3/2 O_2 \rightarrow Fe_2O_3 + 2NaCl + 3Cl_2 \quad (6)$$

The gaseous chlorine generated by this reaction is fed to a second reactor where it reacts exothermically with iron according to equation (3) above and the ferric chloride produced is then mixed with salt and used as the feed material for the first (oxidation) reactor.

Alternatively the chlorine could react with a mixture of iron and salt thus directly forming a liquid $NaFeCl_4$ (or $NaFeCl_3$) feed for the first (oxidation) reactor.

The first (oxidation) reactor could be a packed tower, salt bath or any other suitable gas/liquid reactor, and the second (chlorination) reactor any type of gas/solid reactor such as a packed tower.

The preferred method of carrying out the process according to the present invention is, however, to use a metallic iron feedstock to provide an iron chloride and then oxidise this.

The metallic iron may be ferrous scrap, in the form of turnings, borings, swarf, punchings, coupons, or the like. There are no particular limitations regarding the size, shape, or other preferred physical form of the metallic iron. It is not normally found necessary to etch, degrease or otherwise pre-treat the metallic iron before use.

The use of metallic iron feedstock is advantageous because it is cheap, readily available, easily handled and does not require prior treatment.

This preferred embodiment of the invention has the additional advantage that the process does not result in the co-production of substantial proportions of chlorine gas. The co-production of chlorine gas gives rise to the need for handling, storage and liquefaction of the chlorine and this can impose a severe penalty in terms of the capital cost of equipment needed for chlorine handling. These problems are avoided by this embodiment of the present invention which uses metallic iron feedstock.

The added alkali- or alkaline-earth metal salt may be any salt which acts to suppress or reduce the volatility of ferric and/or ferrous chlorides. Examples are the chlorides, bromides, iodides and sulphates of the alkali- and alkaline-earth metals. The preferred salts are alkali metal chlorides, which form complexes with ferric chloride of general formula $MFeCl_4$ (where M is an alkali-metal cation), and which thereby greatly reduce the volatility of ferric chloride. Of the alkali-metal chlorides, the most preferred salt is sodium chloride, for reasons of its low cost, ready availability, and ease of formation of $NaFeCl_4$ with ferric chloride. Various forms of sodium chloride may be employed, e.g. granular sodium chloride, rock-salt, and the like.

Any suitable oxidising gas may be employed but preferably air or oxygen. The choice of oxidising gas depends on factors such as the reaction rate desired, the temperature of reaction, the reactor heat-load, the ratio of metallic iron to added salt, and the ratio of reactants to inert surface area in the reactor.

The preferred reaction temperature is in the range of from 500° C. to 1000° C. most preferably from 650° to 850° C. The salt:iron weight ratio may preferably fall within the range of 0.25:1 to 10:1. The reaction may be performed batch-wise or continuously.

When the reaction is effected in a packed tower, the inert packing material should be a hard impermeable material. Regular spheres, such as ceramic balls have been found to be particularly suitable.

According to this embodiment of the invention, the micaceous iron oxide product is formed as a film having a thickness of at least $150\mu$ on the ceramic balls. The film thickness must be controlled so as to ensure the formation of a micaceous product having acceptable properties as previously defined. An adequate supply of chlorine or chloride within the reactor must be maintained. In particular when metallic iron is employed as an iron source an amount of chlorine must be supplied which is at least sufficient for the formation of an iron chloride and its subsequent oxidation.

The weight ratio of inert material (ceramic balls) to iron content (expressed as metallic iron) is preferably 4:1 to 20:1, most preferably 6:1 to 10:1.

A further advantage of the process according to the invention is that it consumes very little energy due to the fact that the overall reaction, the oxidation of Fe to $Fe_2O_3$ is exothermic (198.5 k cal per mole of $Fe_2O_3$). Thus, once initiated the reaction is self-sustaining.

The micaceous iron oxide product of the process according to the invention preferably has a major proportion with a maximum particle size in the range of 100 to $200\mu$, more preferably 100 to $150 \mu$ and a preferred median size range of about 35 to $50\mu$. Desirably the product is substantially wholly in the form of lamellar platelets, having a thickness of at least $1\mu$, preferably a median thickness of from about $3\mu$ to about $7\mu$, and more preferably about $5\mu$. The aspect ratio (length:width) is preferably not more than about 3:1 since it has been observed that a higher ratio gives rise to an inferior performance in a paint medium.

Preferred operating conditions are described in more detail in the following description with reference to the accompanying drawings wherein.

According to a first embodiment of the present invention the reduction of ferric chloride is effected in the presence of a suitable added salt as described above, by metallic iron to give ferrous chloride. Using sodium chloride as the added salt, this reaction is illustrated by chemical equation (5) above.

It should be noted that the added salt takes no part in the chemical reaction, but acts to form a molten mixture with the ferric and ferrous chlorides, complexing with the iron chloride and retaining it in the melt, thereby suppressing its volatility. Following the reduction step illustrated by Equation (5), the ferrous chloride thus formed is oxidised to form iron oxide and re-form ferric chloride. Using sodium chloride as the added salt, this oxidation reaction is illustrated by the chemical equation (1) above.

The iron oxide thus formed is separated off by suitable means. If necessary the micaceous iron oxide may be filtered off from the molten mixture of $FeCl_3$ and NaCl in which it may be obtained, depending on the particular process conditions. The ferric chloride is reduced back to ferrous chloride using metallic iron, according to Equation (5). There then follows a further oxidation step according to Equation (1), and so on. No chlorine gas is therefore produced as a co-product of the overall reaction sequence. Moreover the reaction sequence involves starting materials which are cheaply and readily available viz. metallic iron, air or oxygen, and a suitable alakli- or alkaline-earth metal salt. The latter may be recovered and re-used by leaching and crystallisation from the mixture of synthetic micaceous iron oxide and salt formed as the product of the overall reaction sequence.

Figure 1:
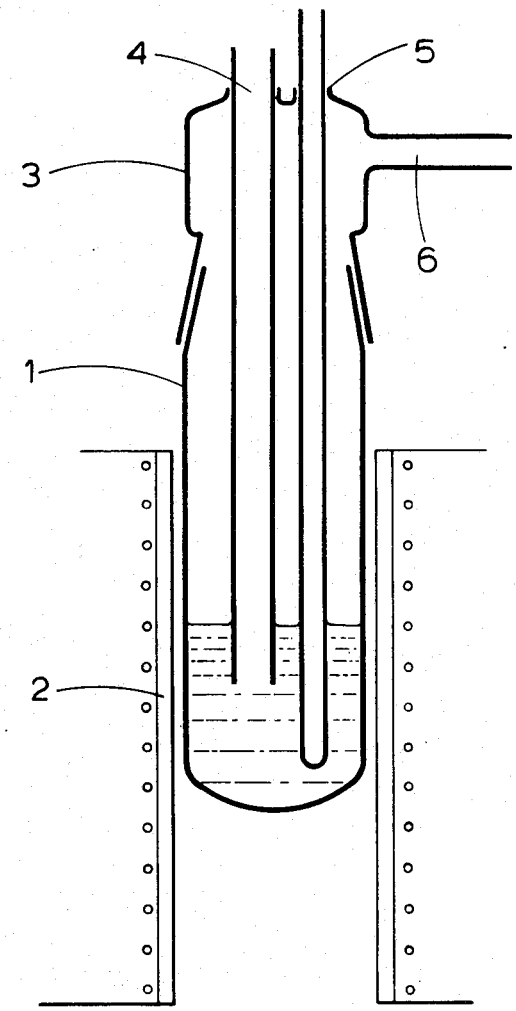
FIG. 1 is a longitudinal section through one embodiment of an apparatus suitable for carrying out the process according to the invention.

This process may be carried out in an apparatus as illustrated in FIG. 1 comprising a gas-tight silica envelope 1, fitted with a gas-tight glass cap 3, which incorporates a gas inlet port 4, a thermocouple entry port 5 and a gas outlet tube 6. The silica envelope is mounted in a vertical resistance-wound tube-furnace 2. The reactant charge is introduced into the envelope 1 and heated under nitrogen. In the second stage of the reaction oxygen or an oxygen-containing gas is introduced through port 4 and conventional means used to analyse the exit gas at 5.

According to a second embodiment of the invention the chlorination of metallic iron, is effected in the presence of a suitable added salt e.g. sodium chloride, to give ferric chloride. The ferric chloride is then oxidised, by using an oxidising gas, to produce micaceous iron oxide and chlorine gas. The reactions involved (using sodium chloride as the salt) are represented by Equations (2) and (4) above.

The reaction system is so designed that the chlorine gas formed as a co-product of the oxidation reaction according to Equation (2) reacts elsewhere in the reactor with metalliciron, forming ferric chloride according to Equation (4). The ferric chloride thus formed is then oxidised, according to Equation (2), producing micaceous iron oxide and re-generating chlorine gas, and so on.

Figure 2:
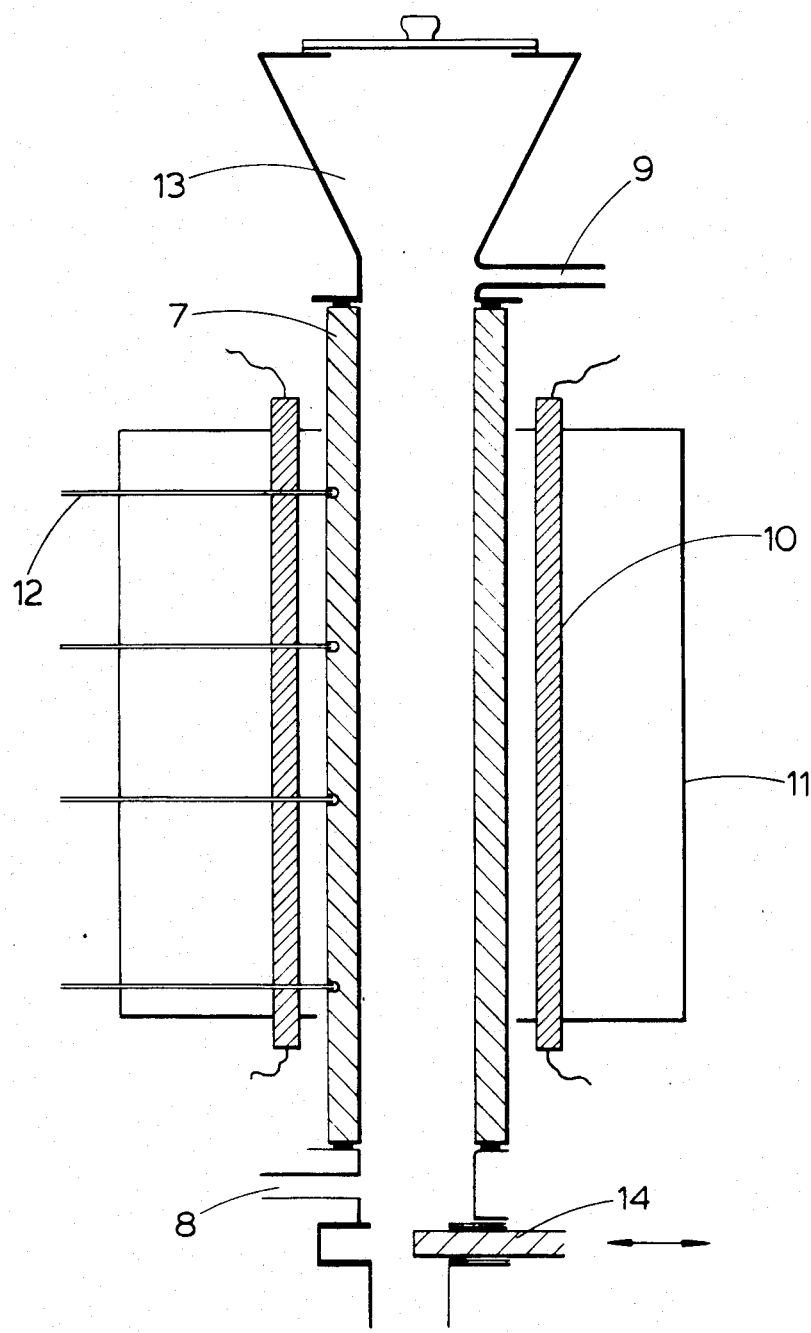
FIG. 2 is a longitudinal section through another embodiment of an apparatus wherein the reactants are distributed over an inert packing material.

This reaction sequence is most easily achieved in a packed-tower reactor as shown in FIG. 2. This contains the reactants (metallic iron and salt) distributed over an inert packing material. This material should be hard and impermeable such as ceramic balls, pebbles, pea gravel or impermeable refractory pieces.

The reactor shown in FIG. (2) consists of a vertical refractory tube 7, 200 mm internal diameter × 1500 mm total length, provided with gas inlet and outlet ports 8 and 9. The central portion (1000 mm long) of the tube was heated externally by means of electrical resistance elements 10 mounted in the thermally-insulated steel jacket 11. Sheathed thermocouples 12 were inserted at various levels into blind holes drilled in the tube 7. During continuous runs, solid reactants were added to tube 7 by means of the gas-tight hopper 13. A pneumatically-operated gate-valve 14 at the base of the tube served to discharge the reaction product, in the form of ceramic balls coated with micaceous iron oxide and salt.

In operation, the reactor was charged with a mixture of aluminosilicate ceramic balls 12 mm in diameter, metallic iron and sodium chloride. The preferred weight ratio of balls:reactants is within the range 4:1 to 20:1. In addition, a "start-up" layer containing ferric chloride or chlorine gas, metallic iron, sodium chloride and ceramic balls was initially placed in the reactor below the main charge. The function of this "start-up" layer was to react with the oxidising gas admitted to the bottom of the reactor, to form synthetic micaceous iron oxide and chlorine according to Equation (2). The micaceous iron oxide and sodium chloride remain as a coating on the ceramic balls, whilst the chlorine passes upwards and reacts with the metallic iron in the reactor charge above the "start-up" layer to form ferric chloride according to Equation (4). The ferric chloride thus formed remains trapped or associated with the sodium chloride and is further oxidised, according to Equation (2), to form further synthetic micaceous iron oxide and chlorine gas.

This type of packed-tower reactor provides a particularly elegant and simple means of directly feeding metallic iron, sodium chloride and oxygen or air into a single reactor, and by employing the intermediate formation and oxidation of ferric chloride, forming synthetic micaceous iron oxide directly, without the co-production of chlorine. The micaceous iron oxide is produced, in admixture with sodium chloride, as a coating on the ceramic balls. Removal of the micaceous iron oxide is achieved easily and rapidly by leaching the coated ceramic balls in water.

Another advantage of the process according to the present invention is the exothermic nature of the overall reaction sequence. The oxidation of metallic iron to give iron oxide is substantially more exothermic than the oxidation of ferrous or ferric chloride to iron oxide which means that in theory, no heat should need to be supplied to the reactor to maintain the required reaction temperature.

The reaction can be operated either continuously or batch-wise, preferably batch-wise. In continuous operation, the ceramic balls are gradually descending down the reactor during the course of the operation, and are continuously or intermittently discharged from the bottom of the reactor. After water-leaching of the discharged balls to remove the micaceous iron oxide, the balls are dried and re-cycled to the top of the reactor, together with a further supply of metallic iron and salt. All the chlorine generated by the oxidation reaction according to Equation (2) remains within the reactor, and forms ferric chloride with the descending metallic iron charge. No chlorine therefore emerges from the reactor as "off-gas". In batch operation, the chlorine evolved as co-product from the oxidation reaction according to Equation (2) gradually moves up the tower, ultimately emerging as an off-gas which may be fed into a second reactor to form the "start-up" layer of ferric chloride. Batchwise operation of the process may therefore require more than one reactor to accommodate transfer and re-use of chlorine values as the process proceeds.

Figure 3:
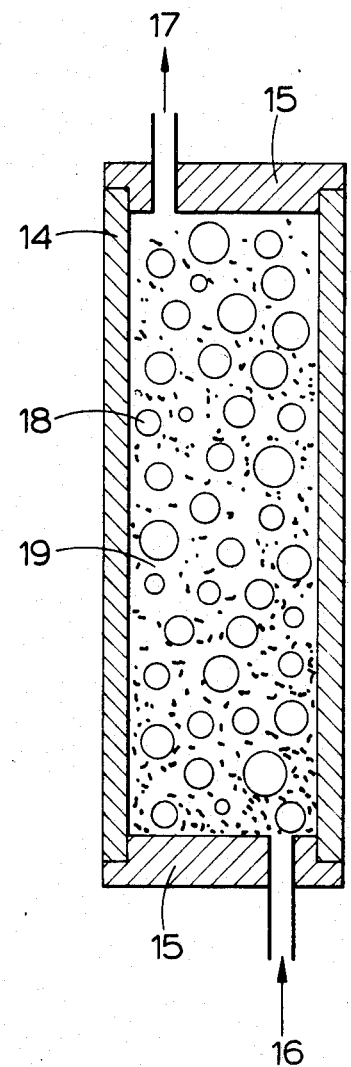
FIG. 3 is a schematic diagram of one embodiment of a ball-tower reactor suitable for carrying out the process according to the invention.

With reference to FIG. 3, an apparatus suitable for carrying out the process according to the invention is schematically illustrated and comprises a refractory reactor tube 14 provided with reaction end-plates 15 and having an inlet 16 for an oxidising gas at one end of the tube 14 and an outlet 17 at the opposite end for an off-gas. The reactor tube 14 is packed with an inert support material 18 preferably ceramic balls and contains a reactant charge 19, the iron source and added salt. The apparatus is shown vertical but a horizontal reactor may also be employed.

Figure 4:
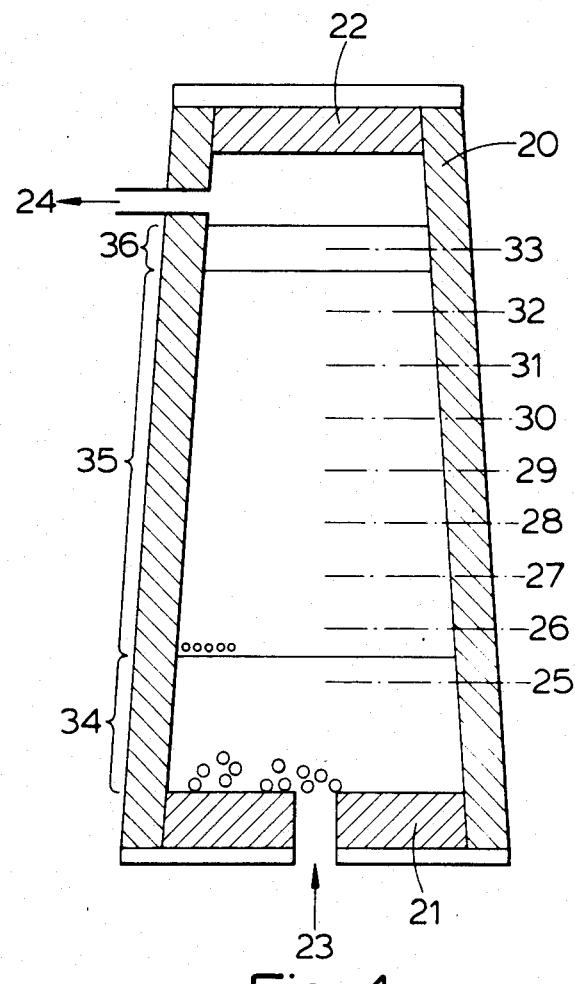
FIG. 4 is a schematic diagram of another embodiment of a ball-tower reactor suitable for carrying out the process according to the invention.

An apparatus suitable for carrying out the process according to the invention is illustrated in more detail in FIG. 4.

The reactor consists of a steel shell (55 cm diameter) lined with a castable refractory 10 cm thick 20. A taper (of slope 1 in 40) was cast in the refractory liner to aid discharge of the reaction products. Refractory lined hinged lids are fitted to the top and bottom 21 and 22 of the reactor and these are adapted to be bolted onto the reactor to form a gas-tight seal.

The reactor is packed with a layer of inert packing material 34, a layer of a mixture of inert packing material, iron and salt 35 and finally with a layer of a mixture of inert packing material and salt.

The charge of iron, salt and inert packing material can be loaded manually into the reactor, a gas burner (not shown) firing through a gas inlet 23 in the bottom lid is used to pre-heat the bottom of the charge. Gases, air and chlorine, are drawn through the reactor, leaving via a gas exit port 24 and a caustic soda gas scrubber by a vacuum pump.

Progress of the reaction up the column of charge is followed by the increase in temperature recorded by the thermocouples, 25 to 33 and by monitoring the chlorine evolved with the off-gas. Completion of the reaction is indicated by the end of chlorine evolution and by the absence of any further temperature rise in the reaction bed.

EXAMPLE 1

A reactant charge comprising ferric chloride (211.3 g), sodium chloride (113.8 g) and metallic iron (36.6 g) was placed in the gas-tight silica envelope 1 of the apparatus shown in FIG. 1, and heated up to 700° C. under nitrogen. On heating up to this temperature, fusion of the $FeCl_3$ and NaCl components of the charge occurred, followed by reduction of the $FeCl_3$ to $FeCl_2$ by the metallic iron according to Equation (5). The reactor and contents were held at 700° C. for 3 hours to effect substantially complete reduction of the $FeCl_3$ to $FeCl_2$. The resulting melt, consisting of $FeCl_2$ and NaCl, was then oxidised at 700° C. to the point of chlorine evolution, i.e. to the point of completion of oxidation according to Equation (1), by passing oxygen at 100 ml/minute via port 4 into the melt for 3 hours. A Dreschel bottle containing potassium iodide solution was placed in the gas outlet tube 5 and served to detect the presence of chlorine. The product of this reaction, consisting of synthetic micaceous iron oxide suspended in a molten mixture of $FeCl_3$, and NaCl was filtered under vacuum through a ceramic fibre filter-cloth. The filter-cake thus obtained was cooled, and leached in water, and the resultant aqueous suspension of synthetic micaceous iron oxide was filtered off, washed and dried at 110° C. The yield of synthetic micaceous iron oxide was 51.8 g corresponding to 98.46% conversion of the metallic iron starting material. Microscopic examination showed that the synthetic micaceous iron oxide thus produced and isolated consisted of lamellar plates in the size range 10 to 150 microns.

EXAMPLE 2

This example similarly illustrates the utilisation of ferric chloride to react with metallic iron, producing ferrous chloride for subsequent oxidation to give synthetic micaceous iron oxide. However, in contrast to Example 1, no filtration stage was involved. Instead, the preferred tendency of the synthetic micaceous iron oxide to form as a deposit on the oxidising-gas inlet tube was used to provide a means of separating the synthetic micaceous iron oxide from the melt.

A melt consisting of ferric chloride (583.8 g), metallic iron (101 g) and sodium chloride (315 g) was heated in a clay-graphite crucible (90 mm internal diameter × 240 mm deep) in an electric furnace to 700° C. under a flow of nitrogen (300 ml/min). The melt was held at 700° C. for 2 hours to permit the reduction of $FeCl_3$ by Fe to take place. Oxidation was then carried out at 700° C. by passing a mixture of oxygen (100 ml/min) and nitrogen (100 ml/min) into the melt via a clay-graphite tube (55 mm internal diameter) immersed to 10 mm from the bottom of the crucible for 6½ hours. The gas inlet tube was then withdrawn to a position above the melt and the apparatus allowed to cool. During the oxidation the gas from the reaction vessel was passed through a Dreschel bottle containing 5% potassium iodide solution to detect and analyze any loss of chlorine.

The melt adhering to the gas inlet tube and remaining in the crucible was analysed with the following results:

|  | Tube | Crucible |
| --- | --- | --- |
| $FeCl_3$ (g) | 68.3 | 129.7 |
| $FeCl_2$ (g) | 29.8 | 117.7 |
| $Fe_2O_3$ (g) | 121.8 | 14.6 |
| NaCl (g) | 128.8 | 185.4 |

The yield of synthetic micaceous oxide, based on the metallic iron input, was 94.5%. 89.3% of this oxide was deposited on the gas-inlet tube. The oxide consisted of thin, translucent lamellar particles, in the size range 20 to 200 microns. The amount of chlorine lost from the system during the run, is measured by the analysis after the run of a Dreschel bottle containing sodium hydroxide placed in the off-gas line, was 0.05 g.

EXAMPLE 3

This was a continuous run, for which the reactor and hopper illustrated in FIG. 2 were charged with a mixture of ceramic balls 12 mm in diameter, metallic iron in the form of mild steel coupons 10 mm × 10 mm, and sodium chloride granules, in the following proportions:
Ceramic balls: 14,400 g
Metallic iron: 700 g
Salt: 700 g
The "start-up" layer placed below the main charge had the following composition:
Ferric chloride: 260 g
Metallic iron: 60 g
Sodium chloride: 175 g
Ceramic balls: 3600 g
The reactor and contents were heated under nitrogen to 700° C. Oxygen at 5 liters/minute was then passed into the bottom of the reactor via the gas inlet tube 8, and by periodically operating the gate-valve 14 the reactor contents were discharged from the reactor 7 into a receiver vessel (not shown in FIG. 2). Complete discharge of the reactor contents was achieved in 5 hours 45 minutes. The coated balls obtained as the crude product from the reactor were divided in a random manner into smaller lots using a sample splitter. One of these smaller lots was leached with water to release the micaceous iron oxide, which was filtered off, washed, and dried. The micaceous iron oxide thus produced was in the form of thin, translucent lamellar particles, of size range 5 to 200 microns. Weighing and chemical analysis carried out on this sample of coated balls gave the following results:

Total weight of ceramic balls: 1882 g
Weight of $Fe_2O_3$: 25.5 g
Weight of $FeCl_3$: 0.1623 g
Weight of $FeCl_2$: 0.254 g
no metallic iron present These results therefore indicated 99 percent conversion of the initial iron content of the reactor to micaceous iron oxide.

EXAMPLE 4

This was a batch run, in which the hopper 13 and gate valve 14 of the reactor shown in FIG. 2 were removed and replaced by gas-tight end-plates. Before the run, the reactor was charged with a "start-up" layer of the following composition:

Ceramic balls: 6000 g
Metallic iron: 125 g
Ferric chloride: 762 g
Sodium chloride: 393 g Above this was placed a main reactor charge, which had the follwing composition:

Ceramic balls: 24,000 g
Metallic iron: 3,000 g
Sodium chloride: 3,000 g

The metallic iron used for this run was in the form of scrap iron borings, ranging in particle size from fine powder up to pieces ca. 5 mm across. This material was used without any pre-treatment such as degreasing.

The reactor was heated under nitrogen to 740° C. The nitrogen supply was then shut off, and air from a compressed air line was passed at 40 liters/minute into the reactor via the inlet tube 8 at the reactor base for a timed period of 8 hours 30 minutes. The sodium hydroxide gas-scrubber solution was periodically sampled and analysed for absorbed chlorine during the run. This analysis showed that 478 grams of chlorine were evolved during the first 8 hours of the run. No further chlorine was evolved during the final 30 minutes of the run, indicating that the reaction had been taken to completion. The weight of chlorine evolved corresponded to a conversion of 95.7 percent, based on the initial chloride content of the reactor.

At the end of the run the air supply was shut off and the reactor and contents allowed to cool, after which the reactor end-plates were taken off and the reactor contents were knocked out using an iron bar. The crude product, in the form of ceramic balls coated with micaceous iron oxide and sodium chloride, was split into fractions corresponding to various levels in the reactor. The weights and the chemical analysis results after water-leaching of three of these fractions, together with the corresponding conversions of the iron content to $Fe_2O_3$, are given below:

| Fraction | Total wt (g) | $Fe_2O_3$ (g) | NaCl (g) | $FeCl_3$ (g) | $FeCl_2$ (g) | % conversion |
|---|---|---|---|---|---|---|
| 1 (lower) | 1676.5 | 25.9 | 29.18 | 0.893 | 0.254 | 97.7 |
| 2 (middle) | 1654.4 | 130.2 | 118.56 | 0.285 | 2.286 | 98.8 |
| 3 (upper) | 2036.5 | 318.7 | 222.37 | 4.773 | 5.158 | 98.3 |

No evidence of unreacted metallic iron was found. The micaceous iron oxide, after leaching, filtration, washing and drying, was in the form of thin lamellar platelets of particle size 10–170 microns.

EXAMPLE 5

This was a batch run carried out in the reactor shown in FIG. 2, using the same proportions of starting materials and run procedure as for Example 4, except that oxygen was used as the oxidising gas. The reactor and contents were heated up to 710° C. under nitrogen, whereupon the nitrogen flow was shut off and oxygen at 10 liters/minute was passed into the reactor via the gas entry tube in the reactor base for 8 hours 20 minutes. The sodium hydroxide gas-scrubbing solution was monitored as described in Example 4, from which it was indicated that 464 g chlorine, corresponding to 93 percent of the initial chloride content of the reactor, had been evolved after 8 hours. At the end of the run, the oxygen supply was discontinued and the reactor and contents were allowed to cool. The reactor contents, consisting of ceramic balls coated with micaceous iron oxide and sodium chloride, were then removed, weighed and samples taken and leached and analysed as before. The results of weighing and chemical analysis of two samples of coated ceramic balls taken from two different heights in the reactor are given below, and indicate the high conversion of metallic iron to micaceous iron oxide:

| Fraction | Total wt (g) | $Fe_2O_3$ (g) | NaCl (g) | $FeCl_3$ (g) | $FeCl_2$ (g) | % conversion |
|---|---|---|---|---|---|---|
| 1 (lower) | 1718.1 | 56.5 | 89.54 | 3.889 | 1.143 | 95.5 |
| 2 (upper) | 1803.7 | 156.0 | 138.34 | 2.843 | 2.222 | 98.2 |

No evidence of unreacted metallic iron was found. The micaceous iron oxide produced was similar in appearance and particle size to the product formed from the run described in Example 4.

EXAMPLE 6

The procedure was carried out in a horizontal mullite reactor tube, 50 mm internal diameter, 60 mm outside diameter, and 1000 mm long.

The constituents for the formation of a ferrous chloride layer were prepared by mixing 270 g 1.27 cm: aluminosilicate balls
65.3 g: $FeCl_3$
11.3 g: Fe
35 g: NaCl This layer occupied 13 cm of length in the middle of the tube and the remainder was packed with clean 1.27 cm aluminosilicate balls.

The tube was heated by the electrical furnace to 700° C. under a flow of $N_2$ (600 ml/min). At this temperature $O_2$ (600 ml/min) was introduced and the chlorine evolved was collected in 5% NaOH solution contained in Dreschel bottles, for subsequent analysis using KI/thiosulphate and by weight. A KI "guard" Dreschel bottle was placed in series with and downstream of the NaOH Dreschel bottles.

No gas was evolved until 5 mins after introduction of $O_2$, when chlorine followed by oxygen was evolved.

The product was recovered by removal of the coated support balls from the tube, followed by leaching in water, filtering off the iron oxide, and analysis of the leach liquor for $Fe^{2+}$, $Fe^{3+}$ and Cl from which mass balance data was obtained.

The experiment was performed in duplicate, with the following results:

| Run A | | |
|---|---|---|
| Time (mins) | Cumulative Chlorine Evolution (g) | Comments |
| 0 | 3.18 | $Cl_2$ evolved during heat up |
| 10 | 4.55 | |
| 17 | 9.80 | |
| 31 | 16.32 | |
| 60 | 17.87 | |
| 120 | 18.42 | |
| 240 | 18.60 | |
| | 4.05 | Residual (KI guard Dreschel bottle etc.) |
| | Total 25.83 g $Cl_2$ | |

Leach solution contained
| | |
|---|---|
| $FeCl_2$ | 0.42 g |
| $FeCl_3$ | 7.09 g |
| NaCl | 35.33 g |
| no unreacted iron | |
| Micaceous iron oxide ($Fe_2O_3$) recovered | = 34.7 g (72% yield) |
| Quality | Particle size range 1–50µ |
| | Average size 20–40µ |
| | Appearance thin translucent lamellar crystals length/breadth 1.5:1 |

Mass Balances (g)

| $Cl_2$ | Input | |
|---|---|---|
| | as $FeCl_3$ | 42.8 |
| | Output | |
| | evolved as $Cl_2$ | 25.8 |
| | as $FeCl_3$ | 4.7 |
| | as $FeCl_2$ | 0.2 |
| | | 30.7 |
| | $Cl_2$ recovery = 72% | |
| Iron | Input | |
| | as $FeCl_3$ | 22.5 |
| | as Fe | 11.3 |
| | | 33.8 |
| | Output | |
| | as Fe | 0 |
| | as $Fe_2O_3$ | 24.3 |
| | as $FeCl_3$ | 2.4 |
| | as $FeCl_2$ | 0.2 |
| | | 27.1 |

Iron recovery 80% (remainder coating tube and support).

| Run B | |
|---|---|
| Time (mins) | Cumulative $Cl_2$ evolved (g) |
| 0 | 0.42 |
| 8 | 3.3 |
| 10 | 6.2 |
| 12 | 10.5 |
| 14 | 14.4 |
| 16 | 17.9 |
| 18 | 21.0 |
| 20 | 23.7 |
| 22 | 25.5 |
| 24 | 26.3 |
| 26 | 26.7 |
| 60 | 27.9 |
| 150 | 28.5 |
| | Residual 0.3 |
| | TOTAL 29.3 g $Cl_2$ |

Leach solution contained
| | |
|---|---|
| $FeCl_2$ | 0.81 g |
| $FeCl_3$ | 11.15 g |
| NaCl | 36.8 g |
| unreacted Fe | 0.8 g |
| $Fe_2O_3$ | 38.6 g |

Micaceous iron oxide
| | |
|---|---|
| ($Fe_2O_3$ yield | 80% |
| quality | Particle size range 1–75µ |
| | Average 25–35µ |
| | Appearance thin translucent lamellar crystals l/b ratio 1.5:1 |

Chlorine Mass balance (g)

| Input | |
|---|---|
| as $FeCl_3$ | 42.8 |
| Output | |
| evolved | 29.3 |
| as $FeCl_3$ | 7.3 |
| $FeCl_2$ | 0.5 |
| as HCl | 4.7 |
| | 41.8 |

$Cl_2$ recovery 97.6%

Iron mass balance (g)

| Input | |
|---|---|
| as $FeCl_3$ | 22.5 |
| as Fe | 11.3 |
| | 33.8 |
| Output | |
| as Fe | 0.8 |
| as $Fe_2O_3$ | 27.0 |
| as $FeCl_3$ | 3.8 |
| as $FeCl_2$ | 0.4 |
| | 32.0 |

Iron recovery 94.8%

EXAMPLE 7

The procedure was as described in Example 6 using the same apparatus except that $O_2$ was introduced at a flow rate of 300 ml/min. The following results were obtained.

| | |
|---|---|
| Chlorine evolved | 23.1 g $Cl_2$ |
| | 1.1 g HCl |
| Leach Solution Analysis | |
| $FeCl_2$ | 0.63 g |
| $FeCl_3$ | 23.8 g |
| NaCl | 35.56 g |
| unreacted Fe | 3.7 g |
| $Fe_2O_3$ | 27.1 g |

| Mass balance (g) | $Cl_2$ | Fe |
|---|---|---|
| Input | | |
| as $FeCl_3$ | 42.8 | 22.5 |
| Fe | — | 11.3 |
| Total | 42.8 | 33.8 |
| Output | | |
| as evolved $Cl_2$ | 23.8 | |
| HCl | 1.1 | |
| as $FeCl_3$ | 15.6 | 8.2 |
| $FeCl_2$ | 0.4 | 0.3 |
| as Fe | — | 3.7 |
| as $Fe_2O_3$ | — | 19.0 |
| | 40.9 | 31.2 |
| Recovery % | 95.5 | 92.3 |

Micaceous iron oxide yield 56%

Quality

Particle size range 1–50µ
Average particle size 40–50µ
Appearance - thin translucent lamellar crystals l/b ratio 1:1 with a small proportion (<5%) of thicker (non-translucent).

EXAMPLE 8

The procedure was as described in Example 6 except that the oxidising gas introduced was 600 ml $N_2$+600 ml $O_2$ per minute. The results were as follows:

| Chlorine evolved | 32.8 g $Cl_2$ |
| --- | --- |
|  | 3.3 g HCl |
| Leach solution |  |
| $FeCl_2$ | 0.91 |
| $FeCl_3$ | 5.13 |
| NaCl | 36.3 |
| Unreacted Fe | 1.1 |
| $Fe_2O_3$ | 38.1 |

| Mass Balance (g) | $Cl_2$ | Fe |
| --- | --- | --- |
| Input as |  |  |
| $FeCl_3$ | 42.8 | 22.5 |
| Fe | — | 11.3 |
|  | 42.8 | 33.8 |
| Output as |  |  |
| evolved $Cl_2$ | 32.8 | — |
| evolved HCl | 3.3 | — |
| $FeCl_3$ | 3.4 | 1.8 |
| $FeCl_2$ | 0.5 | 0.4 |
| Fe | — | 1.1 |
| $Fe_2O_3$ | — | 26.7 |
|  | 40.0 | 30.0 |
| % recovery | 93.5% | 88% |
| Micaceous iron oxide yield 79% |  |  |
| Quality | Particle size range 1–100 μm |  |
|  | Average size 40 μm |  |
|  | Appearance Translucent lamellar crystals, l/b ratio ≃1:1, with proportion (<10%) of thicker crystals. |  |

EXAMPLE 9

A reaction was performed using the apparatus described in FIG. 4.

A reaction charge consisting of 30 cm deep lower layer of 2.53 cms diameter refractory balls (40 kg) to aid gas and heat distribution 34, a 90 cm deep charge layer consisting of a mixture of 1.265 cms diameter refractory balls, (96 kg), iron (12 kg), salt (12 kg) 35 and finally a 10 cm deep layer of a mixture of (1.265 cms) refractory balls (16 kg) and salt (2 kg) 36 was loaded into the reactor.

The bottom of the charge was then heated using the gas burner bolted onto the bottom lid until the temperature recorded by thermocouple 25 reached 775° C. Reaction gases were fed into the tower consisting of chlorine (25 l/minute for 60 minutes) and air (12 m³/hour for 3 hours 15 minutes).

Thus the temperatures recorded by thermocouple 29 about halfway up the reaction bed rose from 366° C. to 803° C. in 45 minutes and by thermocouple 32, the top of the charge, from 186° C. to 783° C. in 120 minutes. Chlorine evolution reached a maximum after 145 minutes. Total chlorine recovery amounted to 3.55 kg representing 80% of the calculated chlorine input (4.4 kg).

On completion of the reaction the bottom and top lids 21 and 22 were unbolted and the charge pushed out into a collection bin using a hydraulic jack.

The refractory balls coated with salt and micaceous iro oxide were then washed with 200 liters of water which dissolved the salt releasing the micaceous iron oxide product. This micaceous iron oxide was filtered, washed free of soluble chloride and dried. 15.2 kg of micaceous iron oxide was obtained, a yield of 89%. Unreacted iron recovered weighed 913 g (7.6% of feed). Soluble iron chlorides in the wash liquor amounted to 340 g $FeCl_2$ and 39 g $FeCl_3$.

EXAMPLE 10

A number of melts were subjected to oxidation at 700° C. in a small salt bath oxidation apparatus as illustrated in FIG. 1 and results are shown in the following Table.

TABLE

| Melt Composition | Mole Ratio | Comments on Product |
| --- | --- | --- |
| $FeCl_3$ $ZnCl_2$ | 1:1 | Small crystals formed including micaceous crystals, size 2.5–10μ. |
| $FeCl_3$ $K_2SO_4$ | 1:1 | Micaceous oxide crystals size range 5–175μ. |
| $FeCl_3$ $Na_2SO_4$ | 1:0.5 | Micaceous crystals, some hexagonal shapes size 5–175μ. |
| $FeCl_3$ $Na_2SO_4$ | 1:1.5 | Micaceous crystals (some hexagonal) size 5–175μ. |
| $FeCl_3$ KI | 1:1 | Micaceous crystals size 5–250μ |
| $FeCl_3$ $Na_2SO_4$ | 1:1 | Micaceous crystals. High proportion of hexagonal shapes size 5–125μ. |
| $FeCl_3$ LiCl | 1:1 | Micaceous plates size 5–150μ |
| $FeCl_3$NaBr | 1:1 | Micaceous lamellar plates size 5–150μ. |

We claim:

1. A combined process for the preparation of micaceous iron oxide which comprises providing in a single reactor at an elevated temperature: metallic iron, a volatility-suppressing salt selected from the group consisting of at least one salt of an alkali metal or alkaline earth metal, and an iron chloride starting material, the elevated temperature being sufficient to maintain iron chloride and the volatility-suppressing salt in a mixed salt-iron chloride molten phase; oxidizing the iron chloride with oxygen or an oxygen-containing gas to form chlorine and a micaceous iron oxide; and permitting the chlorine thus formed to react with metallic iron in the reactor to form a further salt-iron chloride molten phase; and recovering the micaceous iron oxide thus formed, the chlorine being reused sequentially to react with at least a portion of any remaining metallic iron.

2. A process for the preparation of micaceous iron oxide according to claim 1, wherein the metallic iron is initially reacted with chlorine in the presence of at least one salt of an alkali metal or alkaline earth metal to form the iron chloride and wherein the resulting iron chloride is oxidised.

3. A process for the preparation of micaceous iron oxide according to claim 1, wherein metallic iron is initially reacted with ferric chloride in the presence of at least one salt of an alkali metal or alkaline earth metal to form ferrous chloride and wherein the resulting ferrous chloride is oxidised.

4. A process according to claim 1, wherein the reactions are effected at a temperature of about 650° to 850° C.

5. A process according to claim 1, wherein the salt:iron weight ratio is within the range of about 0.25:1 to 10:1.

6. A process according to claim 1, wherein the salt is selected from the group consisting of chlorides, bromides, iodides and sulphates of alkali metals.

7. A process according to claim 6, wherein the salt is sodium chloride.

8. A process according to claim 1, wherein the weight ratio of inert material to iron content (expressed as metallic iron) is about 4:1 to 20:1.

9. The process of claim 1 wherein the iron-chorine reaction and the iron chloride oxidation occur, at least in part, simultaneously.

10. A process of claim 1 wherein the salt is selected from the group consisting of the chlorides, bromides, iodides and sulphates of alkaline earth metals.

11. The process of claim 1 wherein the oxygen or oxygen-containing gas is passed into the reactor to oxidize the iron chloride in the molten phase after the initial mixed iron chloride-salt molten phase is formed, without the addition of further chlorine.

12. The process of claim 1 wherein the source of chlorine value is a start-up layer in the reactor comprising iron chloride and a volatility-suppressing salt, located at an upstream portion of the reactor, the iron chloride and salt forming an initial molten phase which is oxidized by the oxygen or oxygen-containing gas fed to the reactor at the upstream portion, at elevated temperature, to form micaceous iron oxide and chlorine, the chlorine product reacting sequentially with portions of the metallic iron in the reactor.

13. The combined process of claim 1, wherein the iron chloride starting material is generated in the reactor.

14. The combined process of claim 13, wherein the iron chloride starting material is generated by the reaction of metallic iron with chlorine.

15. A combined process for the production of micaceous iron oxide, comprising providing start-up metallic iron and charge metallic iron, a volatility suppressing salt selected from the group consisting of at least one salt of an alkali metal or alkaline earth metal, and a hard, impermeable, particulate packing material, reacting the metallic iron and volatility suppressing salt with chlorine, the chlorine being present in a total amount only sufficient to initially react with the start-up metallic iron to form start-up iron chloride, reacting the iron chloride with oxygen or an oxygen-containing gas to form iron oxide and regenerated chlorine, the reactions occurring at elevated temperatures sufficient to form a molten phase of iron chloride and sodium chloride, such that micaceous iron oxide is recovered, and then reacting the regenerated chlorine with the charge metallic iron in the reactor.

16. A process according to claim 15, wherein the weight ratio of packing material-to-iron content (expressed as metallic iron) is about 4:1 to 20:1.

17. A process according to claim 15, wherein the packing material comprises inert refractory balls.

18. The process of claim 15, wherein the start-up metallic iron is present in an amount less than the charge metallic iron.

19. A combined process for the production of micaceous iron oxide comprising providing start-up metallic iron and charge metallic iron, and sodium chloride, and a hard, impermeable, particulate packing material, reacting the metallic iron and sodium chloride with chlorine, the chlorine being present in a total amount only sufficient to initially react with the start-up metallic iron to form start-up iron chloride, reacting the iron chloride with oxygen or an oxygen-containing gas to form iron oxide and regenerated chlorine, the reactions occurring at elevated temperatures sufficient to form a molten phase of iron chloride and sodium chloride, such that micaceous iron oxide is recovered, and then reacting the regenerated chlorine with the charge metallic iron in the reactor.

20. The process of claim 19 wherein the oxygen or oxygen-containing gas is passed into the reactor to oxidize the iron chloride in the molten phase after the initial mixed iron chloride-salt molten phase is formed, without the addition of further chlorine.

21. The process of claim 19, wherein the process is effected in a tower reactor lined with a refractory material and wherein the packing material comprises refractory balls, the reactor being heated by means of a heat supply at the bottom of the reactor to an elevated temperature in the range of from about 650° C. to about 850° C., and wherein chlorine gas and air are introduced into the bottom of the tower reactor and an off-gas containing chlorine is removed from the top of the reactor, and wherein on completion of the reaction the reaction charge comprising the refractory balls coated with sodium chloride and micaceous iron oxide is removed from the reactor and the micaceous iron oxide is recovered.

22. In the combined process of claim 21, wherein the start-up metallic iron is present in an amount less than the charge metallic iron.

* * * * *